G. H. SMITH.
BABY CARRIAGE.
APPLICATION FILED AUG. 18, 1920.
1,375,614.
Patented Apr. 19, 1921.
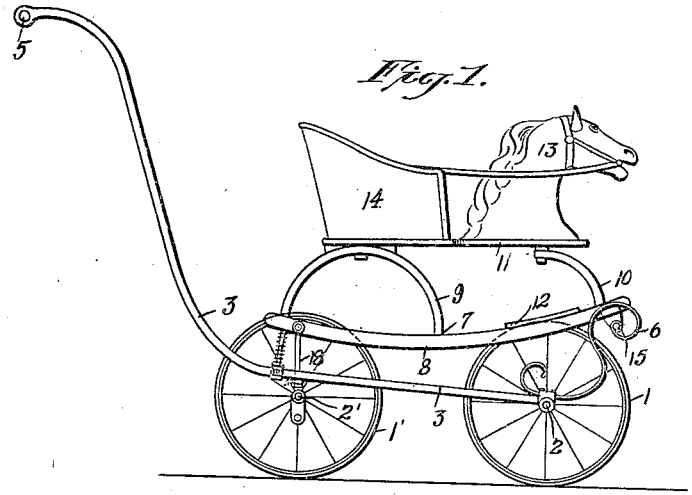
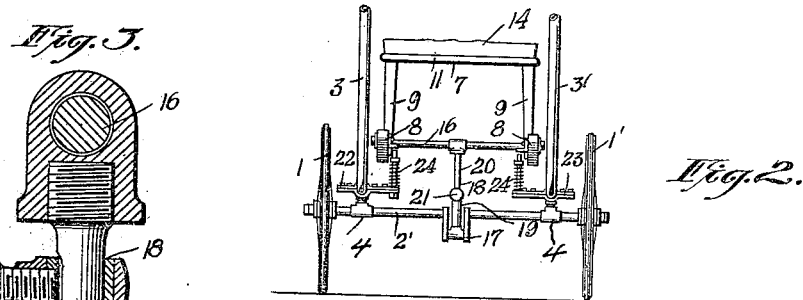
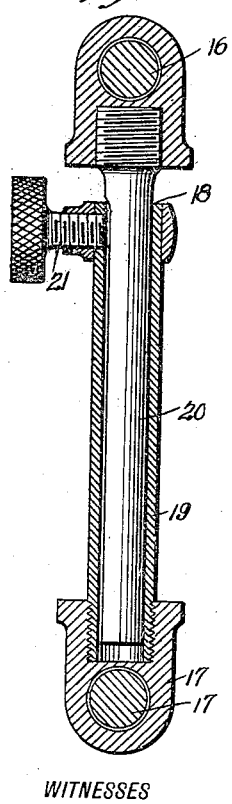
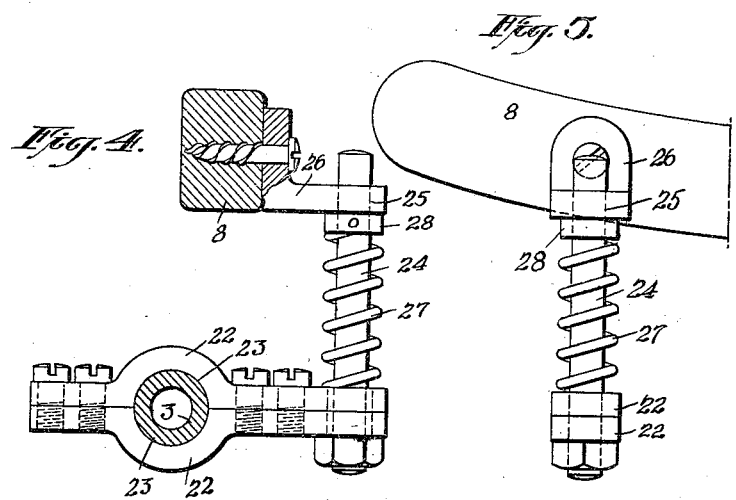
WITNESSES
INVENTOR
George H. Smith.
BY
ATTORNEYS

UNITED STATES PATENT OFFICE.

GEORGE H. SMITH, OF NEWPORT, RHODE ISLAND.

BABY-CARRIAGE.

1,375,614.  Specification of Letters Patent.  Patented Apr. 19, 1921.

Application filed August 18, 1920. Serial No. 404,423.

*To all whom it may concern:*

Be it known that I, GEORGE H. SMITH, a citizen of the United States, and a resident of Newport, in the county of Newport and State of Rhode Island, have invented a new and Improved Baby-Carriage, of which the following is a full, clear, and exact description.

The invention relates to improvements in baby carriages, an object of the invention being to provide an improved device of this type wherein the movement of the carriage will automatically impart a vertical rocking movement to the body of the same.

A further object is to provide a novel construction which normally causes a vertical movement of the carriage as it moves and at the same time provide a construction which allows the rocking mechanism to be thrown out of operative engagement with the body so that the carriage may be moved without imparting movement to the body.

A still further object is to provide a baby carriage which will be simple and practical in form, yet strong and durable in use.

With these and other objects in view the invention consists of certain novel features in construction as will be more fully hereinafter described and pointed out in the claims.

In the accompanying drawings:

Figure 1 is a view in side elevation of my improved baby carriage with two of the wheels removed;

Fig. 2 is a fragmentary view in rear elevation;

Fig. 3 is an enlarged view in longitudinal section of the connecting rod and its associated parts;

Fig. 4 is an enlarged view in rear elevation of the shock absorbing mechanism;

Fig. 5 is a similar view in side elevation.

Referring in detail to the drawings my improved baby carriage is supported on four wheels. The front wheels 1 and the rear wheels 1' are adapted to turn with the front and rear axles 2 and 2' respectively. A pair of handles and frame members 3 are connected to the front axle 2 and extending rearwardly over the rear axle 2' curving upwardly and rearwardly behind the carriage.

A pair of bearing sleeves 4 on the rear axle 2' support the frame members 3 on the axle. A handle bar 5 is supported at the rear ends of the frame members 3. The front axle 2 also supports a pair of springs 6. The body 7 is carried by a pair of rockers 8 and connecting bars such as 9, 9 and 10 may be used to support a platform 11 on the rockers. The rockers also support a foot rest 12 adapted to accommodate the feet of the child occupying the carriage. An ornament such as the animal head 13 may be supported on the platform 11 forwardly of the basket or seat 14. The nature of the ornament 13 in no way affects the operation of the device, but is rather designed to give an attractive appearance to the vehicle.

Cross rods 15 and 16 connect the rockers 8 adjacent their forward and rear ends respectively. The forward rod 15 is mounted to turn in bearings on the springs 6 and provide a pivotal mounting for the forward end of the body. A crank arm 17 constitutes a part of the rear axle 2 and a telescoping connecting rod 18 operatively connects the cross rod 16 with said crank arm.

I have spoken of the rod 18 as a telescoping rod since it comprises a sleeve 19 connected to the crank arm and a rod 20 connected to the cross bar 16. A set screw 21 projects through the sleeve 19 and engages the rod 20 and normally maintains the sleeve 19 and rod 20 in fixed relationship. However by releasing the screw 21 the rod will be free to telescope in the sleeve as will be readily understood.

When the set screw 21 is screwed home to lock the rod and sleeve together it will be readily seen that by pushing the carriage forwardly or rearwardly the crank arm 17 will turn with the rear axle 2' and through the medium of crank arm and connecting rod 18 impart a vertical rocking movement to the body about its forward pivotal point.

Pairs of castings 22 having opposed recesses 23 are clamped about the frame members 3 rearwardly of the rear axle 2' and the ends of the castings 22 support upwardly projecting bolts 24. The ends of the bolts 24 register with perforations 25 in angle brackets 26 carried by the rockers 8. Coil springs 27 are located about the bolts 24 between the castings 22 and nuts 28 carried by the bolts.

It will be seen that by moving the set screw 21 out of engagement with the rod 20 and positioning the brackets 26 over the bolts 24 no motion will be imparted to the body 7 when the carriage is rolled over the ground. In this instance the turning of the crank arm 17 will merely cause the telescoping of the rod 20 within the sleeve 19 and the springs 27 will serve as shock absorbers for the rear end of the body.

It is obvious that the rod 18 and its associated parts might be positioned at the forward end of the vehicle instead of at the rear end without materially affecting the operation of the device and the rocking or a reciprocating movement of the body is optional and need not necesarily accompany the movement of the carriage.

It will also be apparent that while I have illustrated and described one of the preferred embodiments of my invention various slight changes and alterations might be made in the general form of the parts described without departing from my invention and hence I do not limit myself to the precise details set forth, but consider myself at liberty to make such slight changes and alterations as fairly fall within the spirit and scope of the appended claims.

I claim:

1. In a baby carriage, the combination with a supporting truck, of a body portion pivotally mounted at its forward end on the truck, a cushioned frame normally supporting the rear end of the body portion, a crank arm carried by the rear axle of the truck, a telescoping connecting rod connecting the crank arm and the rear end of the body, and a locking member adapted to lock the parts of the telescoping connecting rod against independent movement.

2. The combination with a vehicle comprising a body portion pivotally supported at one end on the frame work of the vehicle and resting at its other end on a cushioned frame, of a crank arm carried by a wheel axle, a sleeve carried by the crank arm, a pin depending from the last mentioned end of the body portion and located in the sleeve, said sleeve and pin adapted to telescope when the vehicle is moved over the ground, and means for locking said sleeve and pin against independent movement, whereby the movement of the carriage over the ground rocks the body about its pivotal point.

3. In a baby carriage, a pair of longitudinal frame bars supported on the rear axles of the carriage, a pair of springs of general S-shape carried by the forward ends of the longitudinal frame bars, the forward end of the body portion of said vehicle having pivotal mounting in said springs, transversely positioned split clamping members around the rear ends of the frame bars, upwardly extending pins carried by the clamping members, nuts loosely mounted on the pins, coiled springs around the pins between the nuts and the clamping members, perforated angle brackets secured to the rear end of the body portion receiving the pins and supported on the nuts.

4. A device of the character set forth in claim 3, including means for rocking the body portion about its pivotal point when the carriage is moved over the ground, said means comprising a crank arm carried by the rear axle, a telescoping connecting rod connecting the crank arm and the rear end of the body, and a locking member adapted to lock the parts of the telescoping connecting rod against independent movement.

GEORGE H. SMITH.